US007072077B2

(12) United States Patent
Anderson et al.

(10) Patent No.: US 7,072,077 B2
(45) Date of Patent: Jul. 4, 2006

(54) HARDCOPY PRINTING DEVICE WITH CAPACITIVE PRINT MEDIA MONITOR AND METHODS OF MAKING AND USING THE SAME

(75) Inventors: Bradley J. Anderson, Boise, ID (US); Bruce L. Johnson, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 975 days.

(21) Appl. No.: 09/859,852

(22) Filed: May 16, 2001

(65) Prior Publication Data

US 2002/0171858 A1 Nov. 21, 2002

(51) Int. Cl.
*H04N 1/40* (2006.01)

(52) U.S. Cl. .................................... 358/3.32; 358/1.12

(58) Field of Classification Search ................ 358/1.9, 358/2.1, 1.12, 3.32; 399/195, 258, 23–24, 399/199

See application file for complete search history.

(56) References Cited

U.S. PATENT DOCUMENTS

| | | | | | |
|---|---|---|---|---|---|
| 5,168,239 | A | * | 12/1992 | Winship | 324/671 |
| 5,682,184 | A | * | 10/1997 | Stephany et al. | 347/7 |
| 6,095,629 | A | * | 8/2000 | Froger et al. | 347/7 |
| 6,247,363 | B1 | * | 6/2001 | Froger et al. | 73/304 C |

FOREIGN PATENT DOCUMENTS

EP 208377 A * 1/1987

* cited by examiner

*Primary Examiner*—Thomas D. Lee
*Assistant Examiner*—Stephen Brinich

(57) ABSTRACT

A printing device can include a capacitive monitoring system to monitor the amount of print medium (e.g., paper) available in the printing device. The capacitive monitor includes conductive plates above and below the supply of print medium. With the print medium acting as a dielectric element, the capacitance of the system will change as print medium is removed from the supply. This change in capacitance can be used to monitor the supply of print medium in the printing device.

37 Claims, 7 Drawing Sheets

HARDCOPY PRINTING DEVICE WITH CAPACITIVE PRINT MEDIA MONITOR AND METHODS OF MAKING AND USING THE SAME

BACKGROUND

With modem office equipment, documents for virtually any purpose can be easily prepared, transmitted, printed or copied as needed. For example, with a computer system, a user can generate and transmit documents with almost any format, including text and graphics as needed by the user. A printer can be connected to the user's computer, directly or through a network, to allow the user to generate a hardcopy or copies of the document. These printed documents can be of very high quality.

With a photocopier, a document can be quickly duplicated a number of times so that the user has as many copies as are needed. With a facsimile machine, or fax machine, the user can transmit and receive hard copies of documents. As used herein and in the appended claims, the term "printing device" is used broadly to include any device that outputs hard copies of a document. The input to the printing device may be, for example, another hard copy document that is to be duplicated, an electronic document transmitted electronically from a host computer or network, or a document transmitted electronically over a phone line by a fax machine or modem.

Each of these printing devices that output hard copies of documents typically include a supply of a print medium on which to print or copy. This print medium is usually paper, but can be a host of other print media including cardstock, construction paper, adhesive labels, transparencies, and the like. As used herein, the term "print media" or "print medium" is used broadly to denote any material on which a printer, fax machine, printing device or copier can output documents.

Typically, each of these printing devices that include a supply of a print medium also have a feeder device that automatically takes sheets of print media from the supply as needed for printing or copying by the printing device. When the supply of the print medium is exhausted, the user will have to replenish the supply. Typically, the printing device has a screen on which a message indicating the need to replenish the print medium supply is displayed. Other means of prompting the user to replenish the print medium supply can also be employed, such as sending a message to a host computer that the attached printer is out of paper.

It can be a time-consuming task to see that all available printing devices are constantly supplied with enough print media, particularly in an office setting where a number of users share printers, fax machines, photocopiers and other printing devices. It is frustrating to have a printing device run out of print media while executing a print or copying job. This is particularly frustrating when a user has a long print or copy job, starts the job on the printing device and then devotes attention to something else. The user may return expecting the print or copy job to be completed only to find that the printing device ran out of print media, e.g., paper, some time ago and has not completed the job.

Consequently, there is a need in the art for a means of monitoring the amount of print media available in a printing device. In particular, there is a need to indicate to a user who is initiating a print or copy job the amount of print media available to the printing device so that the user can know whether the print or copy job can or likely will be completed without replenishing the supply of print media in the printing device.

SUMMARY

The present specification describes a means of monitoring the amount of print media available in a printing device.

The present specification further describes a printing device with a capacitive monitoring system for monitoring the amount of print medium available. The printing device may be a printer, a photocopier, a digital copier, a facsimile machine, a multi-function peripheral, etc.

The printing device of the present invention includes a capacitive monitor for determining capacitance in accordance with the amount of print medium available. The capacitive monitor consists of first and second conductive elements to which a voltage is applied. The conductive elements may be, but are not limited to, conductive plates, wires, wire mesh, and/or electrodes. For simplicity, conductive plates may be preferred. When the printing device is in operation, a supply of the print medium is interposed between the first and second conductive plates and functions as a dielectric element. The capacitive monitor determines the amount of print medium available in accordance with capacitance measurements.

A first of the conductive plates is preferably located on a cantilever and biased toward the supply of print medium so as to remain in contact with the print medium. The second of the conductive plates is disposed in a print medium tray that holds the supply of the print medium. The print medium may be paper or any other print medium.

The printing device described herein may also have a display on which the amount of print medium available is displayed. Alternatively, the printing device may have a connection to a host computer and may transmit an indication of the amount of print medium available to the host computer.

In a second preferred embodiment, the printing device described herein may further include a second capacitance monitor located in a transport path of the printing device. The second capacitance monitor determines the capacitance attributable to a single piece of print medium moving through the transport path. The original capacitive monitor then determines the amount of print medium available in accordance with capacitance measurements from the original The present specification also describes the methods of making and using the printing device described above. Particularly, the present specification describes a method of monitoring an amount of print medium available in the printing device using a capacitive monitoring system by (1) monitoring changes in capacitance of first and second conductive elements to which a voltage is applied with a supply of the print medium interposed between the first and second conductive plates, the supply of print medium being depleted during operation of the printing device; and (2) determining the amount of print medium available in accordance with the changes in capacitance.

The method may also include measuring a change in capacitance as a piece of the print medium is removed from the supply of print medium; and determining the amount of the print medium available by comparing the change in capacitance to a capacitance measured across the supply of print medium. A second preferred embodiment of the method may include measuring a capacitance of a single piece of the print medium as that piece of print medium moves through a transport path of the printing device; and determining the amount of the print medium available by comparing the capacitance of the single piece of print medium to a capacitance measured across the supply of print medium. This method also preferably includes re-measuring the capacitance of a single piece of the print medium whenever the supply of the print medium is removed from the printing device and then replaced.

BRIEF DESCRIPTION OF THE DRAWINGS

The accompanying drawings illustrate preferred embodiments of the present invention and are a part of the specification. Together with the following description, the drawings demonstrate and explain the principles of the present invention.

In the drawings, identical elements are indicated with identical reference numbers.

DETAILED DESCRIPTION OF THE PREFERRED EMBODIMENTS

As used herein and in the appended claims, the term “printing device” is used broadly to include any device that outputs hard copies of a document. For example, the term “printing device” includes, but is not limited to, printers, fax machines, photocopiers, digital copiers, multi-function peripherals, plotters, etc. The input to the printing device may be, for example, another hard copy document that is to be duplicated, an electronic document transmitted electronically from a host computer or network, or a document transmitted electronically over a phone line by a fax machine or modem. As used herein and in the appended claims, the term “print media” or “print medium” is used broadly to denote any material on which a printing device can output a hard copy of a document.

Figure 1:
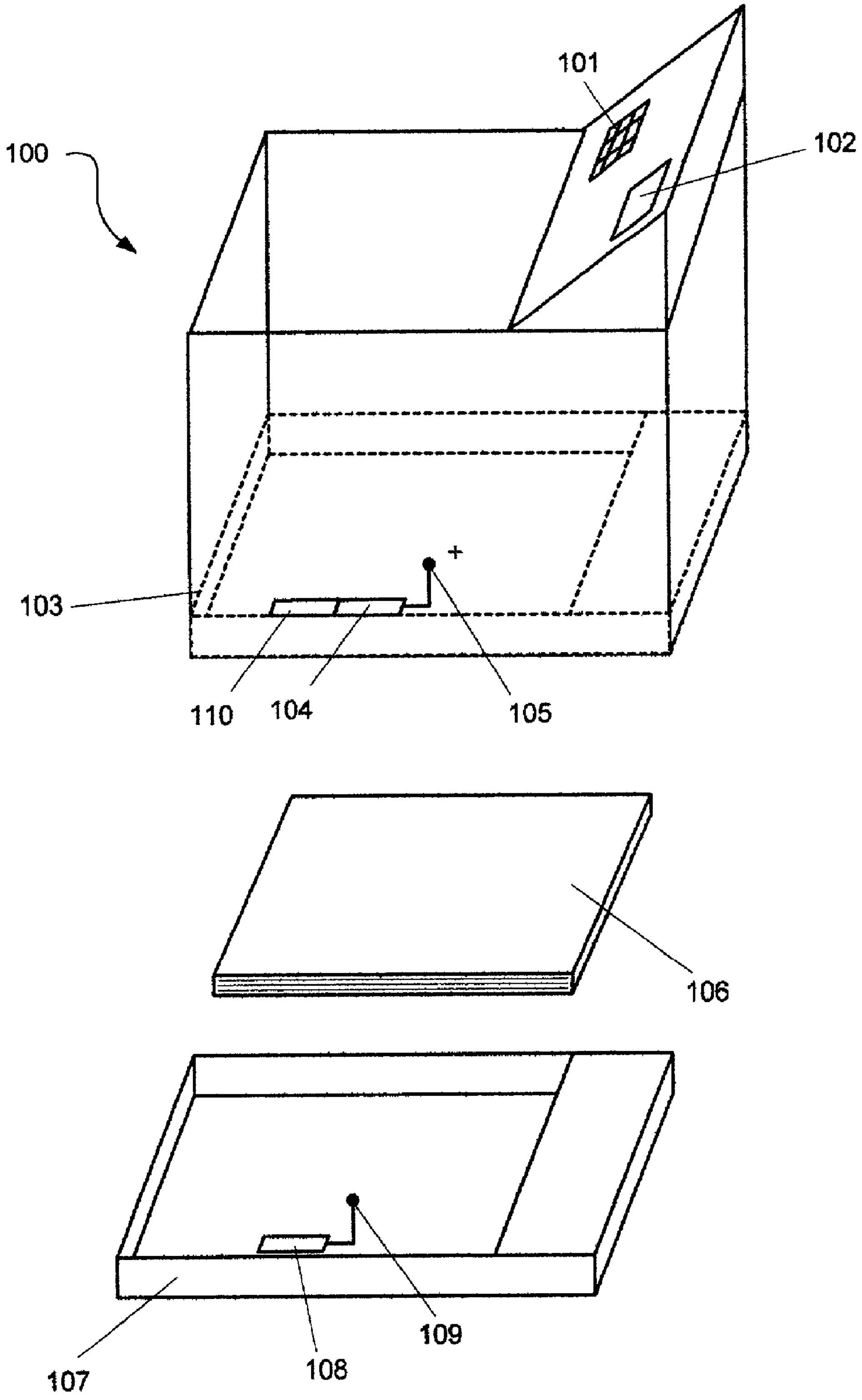
FIG. 1 is an illustration of a first embodiment of a print media monitor incorporated in a printing device according to the principles of the present invention.

As shown in FIG. 1, a printing device can monitor its supply of a print medium by incorporating a capacitance monitor which measures the capacitance of two conductive elements to which a voltage is applied, with the supply of print media being disposed as a dielectric element between the two conductive elements. The conductive elements may be, but are not limited to, conductive plates, wires, wire mesh, and/or electrodes. For simplicity, conductive plates may be preferred.

The embodiment of FIG. 1 illustrates a printer as the printing device in which the present invention is implemented. This is merely exemplary. Those of skill in the art will, upon reading this specification, readily understand that the present invention can be implemented in any printing device which contains a supply of a print medium that is used by the printing device to output hardcopy documents.

As shown in FIG. 1, the printer (100) preferably includes a control panel (101) and a small display screen (102). The display screen (102) can be used to display an indication of the amount of print medium available in the printer (100).

The printer (100) pictured in FIG. 1 also includes a cavity (103) for containing a tray (107) that holds a supply of a print medium (106). The top portion of FIG. 1 illustrates the printer (100) with the inserted tray (107) shown in ghost. In the example of FIG. 1, the illustrated print medium is a stack of paper (106). However, as will be appreciated by those skilled in the art, any print medium could be used.

As shown in the bottom portion of FIG. 1, a conductive plate (108) is disposed in the bottom of the tray (107). When the print medium supply (106) is placed in the tray (107), the print medium supply (106) will rest on and over the conductive plate (108). The conductive plate (108) is also connected to a terminal (109) so that a voltage can be applied when the tray (107) is located in the printer (100).

As shown in the top portion of FIG. 1, a second conductive plate (104) is disposed in the printer (100) above the location of the tray (107) (when inserted) and the print medium supply (106) held by the tray (107). Again, a terminal (105) is connected to the second conductive plate (104) so that a voltage can be applied across the two conductive plates (104, 108) when the tray (107) is inserted in the printer.

The second conductive plate (104) is preferably mounted on a cantilever (110). The cantilever (110) may be a leaf spring or other biased support structure that forces the second conductive plate (104) downward against the print medium supply (106) in the tray (107). Consequently, as sheets of the print medium are removed from the tray (107) for printing, the second conductive plate (104) will be urged further downward by the cantilever (110) so that the second conductive plate (104) remains in contact with the stack of print medium (106).

Because the print medium (106) is not conductive, it forms a dielectric element between upper and lower conductive plates (104, 108). The result is a capacitor that has a capacitance that will vary depending on the amount of print medium (106) disposed between the upper and lower conductive plates (104, 108). Consequently, as will be explained in more detail below, by monitoring the capacitance of the conductive plates (104, 108) in combination with the supply of the print medium, the amount of print medium can be determined with a high level of accuracy.

Figure 1A:
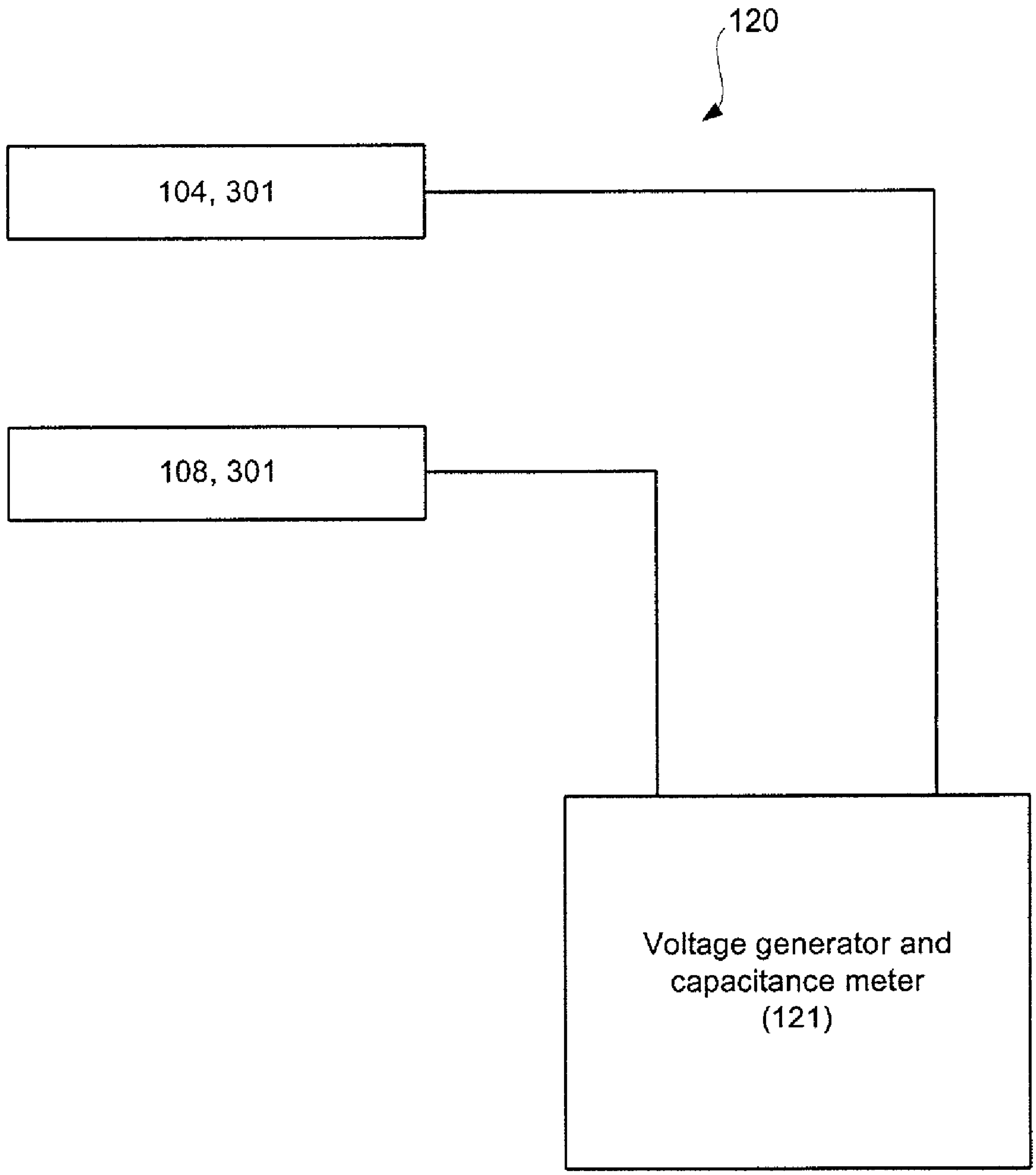
FIG. 1*a* is an illustration of a capacitance monitor of the present invention.

FIG. 1*a* illustrates a capacitance monitor (120) of the present invention in more detail. As shown in FIG. 1*a*, the capacitance monitor (120) consists of two conductive plates (104/108, 301) between which a print medium, as a dielectric element, is placed. The plates are connected to a voltage generator and capacitance meter (121). The required equipment and methods for measuring the capacitance of a capacitor are known and will not be described in more detail here. The upper and lower conductive plates (104, 108, 301) and the supporting circuitry for measuring capacitance and calculating available print medium quantities based on capacitance measurements shall be referred to herein collectively as a “capacitance monitor” (120).

The printer (100) illustrated in FIG. 1 makes use of a tray (107) for storing the print medium supply (106). However, as will be appreciated by those skilled in the art, the present invention could also be implemented in a printer or printing device in which the print medium is inserted directly into a print medium bay of the printing device without the use of a print medium tray.

Figure 2:
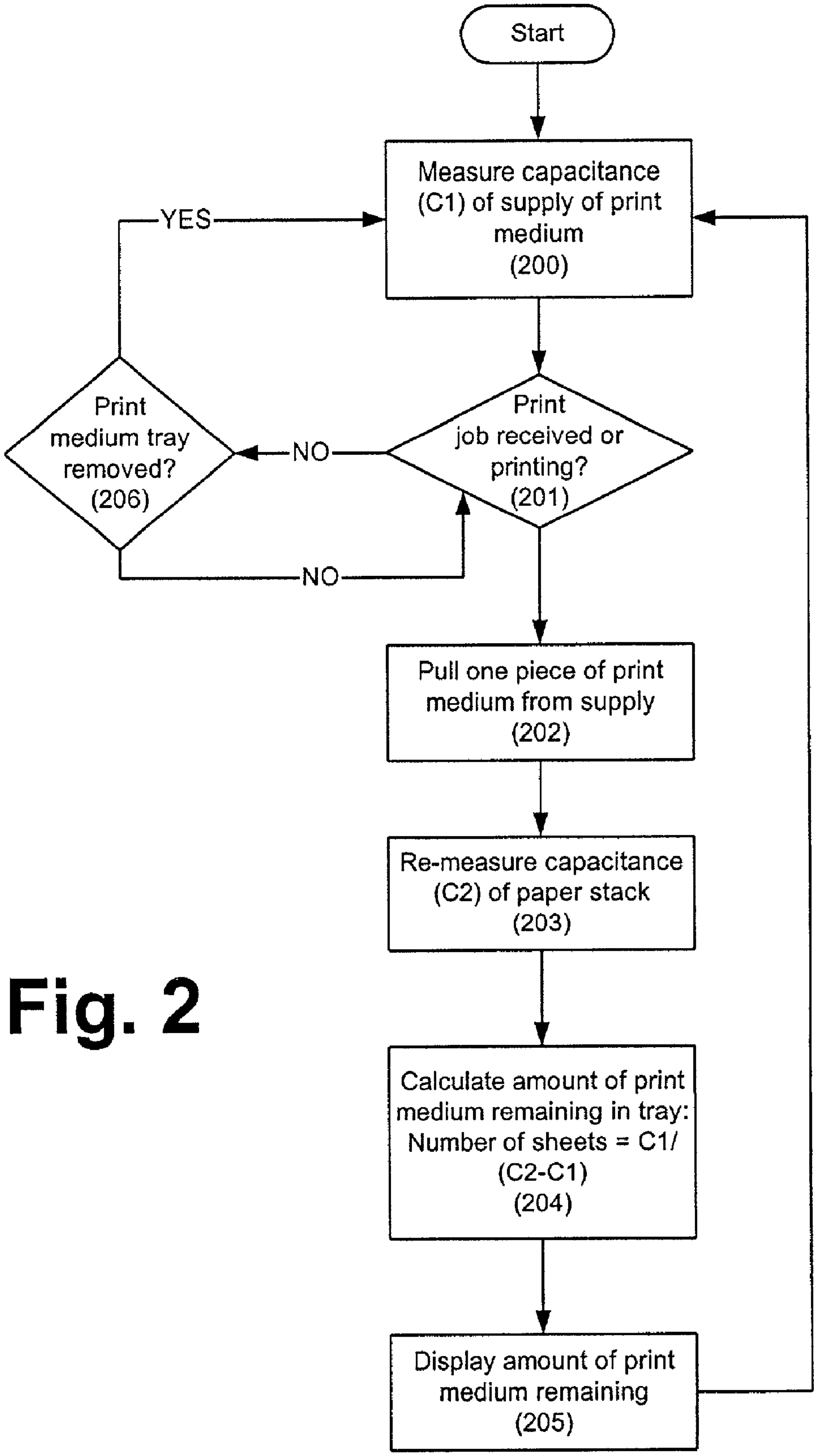
FIG. 2 is a flowchart detailing the operation of the print media monitor pictured in FIG. 1.

FIG. 2 illustrates in detail a preferred method of monitoring the amount of print medium in the printer or printing device of FIG. 1 using the capacitance monitor, also illustrated in FIG. 1. As shown in FIG. 2, the capacitance monitor is used to take a first measurement of the capacitance (C1) across the upper and lower conductive plates and the print medium disposed between the conductive plates (200). The printer then waits to receive a print job (201). If the print medium tray is removed from the printer (203), print media may have been added to or removed from the tray. Consequently, the capacitance (C1) is re-measured. If the tray is not removed, the re-measurement is unnecessary.

When a print job is received, the feeder mechanism of the printer will remove a sheet of the print medium from the supply to be printed on by the printer (202). The removal of this sheet from the print medium supply will alter the capacitance across the upper and lower conductive plates and the remaining, interposed print media. Consequently, once the sheet is removed from the supply, a second capacitance (C2) is measured using the capacitance monitor (203).

The difference between the first capacitance (C1) and the second capacitance (C2) is the capacitance attributable to a single sheet of the print medium. Consequently, the number of sheets of print medium in the printing device can be determined by C1/(C2−C1) (204). If it is preferred to determine the number of sheets of print medium remaining in the supply, not counting the sheet that was pulled between the measurement of C1 and C2, the formula can be altered to C2/(C2−C1).

Preferably, the method then includes displaying for the user the number of sheets of print medium remaining (205). This display, as indicated above, may be on a display screen on the printing device. Alternatively, the display indicating the amount of remaining print medium may be transmitted to a host computer connected to the printing device and displayed on the host computer. In either case, the user can determine if there is enough print medium in the printing device to complete the print or copy job being initiated by the user.

For accuracy, the capacitance should be re-measured after each pull of media from the medium tray. This is necessary since the capacitance value is a non-linear function based on the distance between the two conductive plates/materials. The capacitance measurements can be stored between each pull of media in order to calculate future capacitance differences as they occur. In another preferred embodiment, (C2−C1) should be re-measured if the print medium tray is removed, indicating that the type of print medium being used may have changed.

Figure 3:
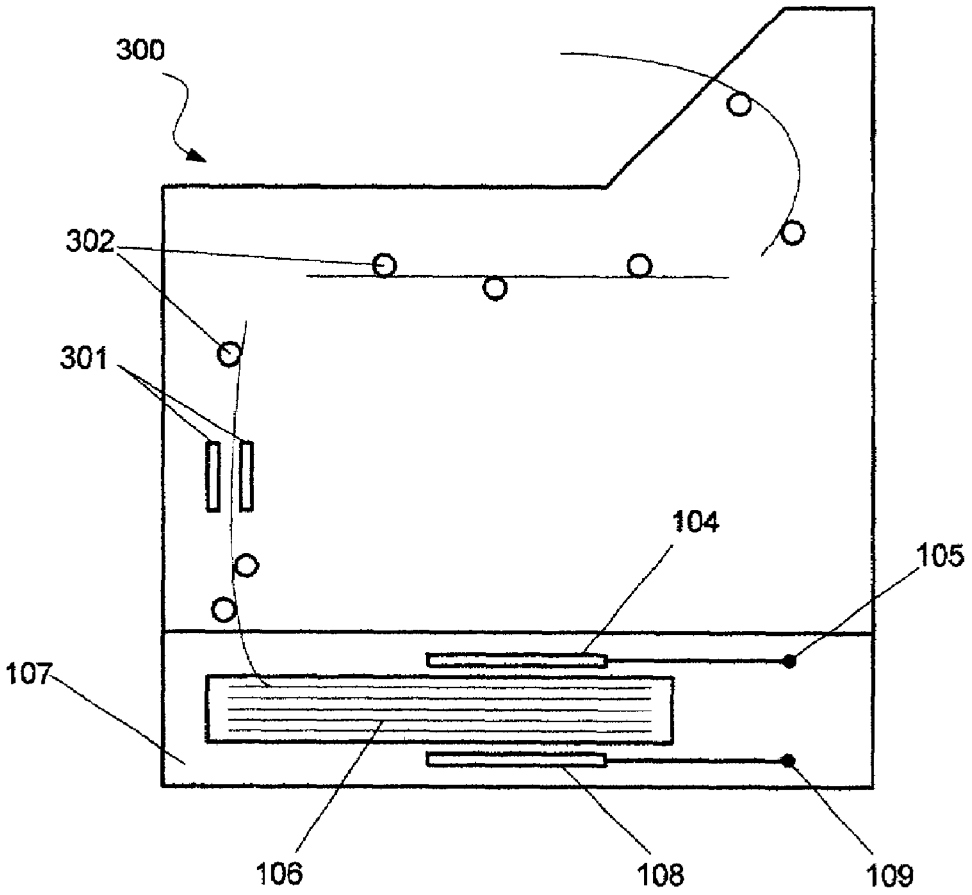
FIG. 3 is an illustration of a second embodiment of a print media monitor incorporated in a printing device according to the principles of the present invention.

FIG. 3 illustrates a second preferred embodiment of the principles described herein. Again, the embodiment of FIG. 3 illustrates a printer as the printing device. This is merely exemplary. Those of skill in the art will, upon reading this specification, readily understand that the principals described herein can be implemented in any printing device which contains a supply of a print medium that is used by the printing device to output hardcopy documents.

As shown in FIG. 3, the printer (300) of the second embodiment includes a capacitive monitor of the supply of print medium (106). This capacitive monitor is similar to the monitor described above in connection with FIG. 1. Preferably, a conductive plate (108) is disposed below, and in contact with the supply of the print medium (106). The conductive plate (108) is also connected to a terminal (109) so that a voltage can be applied when a measure of capacitance is being taken. A second conductive plate (104) is disposed in the printer (300) above the location of the print medium supply (106). A terminal (105) is connected to the second conductive plate (104) so that a voltage can be applied across the two conductive plates (104, 108) when a measure of capacitance is being taken. The second conductive plate (104) is preferably mounted on a cantilever, such as a leaf spring or other biased support structure, that forces the second conductive plate (104) downward against the print medium supply (106). Consequently, as sheets of the print medium are removed for printing, the second conductive plate (104) will be urged further downward by the cantilever so that the second conductive plate (104) remains in contact with the stack of print medium (106).

Because the print medium (106) is not conductive, it forms a dielectric element between upper and lower conductive plates (104, 108). The result is a capacitor that has a capacitance that will vary depending on the amount of print medium (106) disposed between the upper and lower conductive plates (104, 108). Consequently, as will be explained in more detail below, by monitoring the capacitance of the conductive plates (104, 108) in combination with the supply of the print medium, the amount of print medium can be determined with a high level of accuracy.

In the first preferred embodiment, the capacitance attributable to a single piece of print medium was determined by measuring the capacitance of the entire supply of print medium before and after a single piece was removed for printing and then taking the difference between the two measurements. In the second preferred embodiment, a second capacitance monitor is placed in the print medium transport path. The print medium transport path is the path a piece of print medium takes through the printer (300) as it is used to generate a hardcopy of a document. The print medium transport path is preferably defined by a number of rollers (302) that move the print medium along the transport path.

In moving along the transport path, a piece of print medium passes through the second capacitive monitor, which includes two parallel conductive plates (or other elements for measuring capacitance, such as, but not limited to, wires, wire mesh, and/or electrodes). This second capacitive monitor (301) is shown in FIG. 3. As the print medium is moving through the second capacitive monitor (301), capacitance is measured. This capacitance is the capacitance associated with and attributable to a single sheet of the print medium being used. Consequently, the approximate number of pieces of print medium remaining in the supply (106) can be determined by dividing the capacitance of a single piece of the print medium, measured by the second capacitive monitor (301) in the transport path by the capacitance of the stack of print medium (106), measured by the first capacitive monitor (104, 108). This method determining the amount of print medium in the supply (106) will be described in more detail with reference of FIGS. 4 and 5.

Capacitance (C) is defined as the area (A) of each conductive plate used to measure the capacitance multiplied by a constant (k) and divided by the distance (d) between the plates or other measuring element [C=kA/d]. In the event that the area of the first capacitive monitor is not equal to the area of the second capacitive monitor, then the approximate number of pieces of print medium remaining in the supply (106) can be determined by first determining the product of the area of the first capacitance monitor (104, 108) (noted as A1) multiplied by the capacitance of a single piece of the print medium, measured by the second capacitive monitor (301) in the transport path (noted as C2). Next the product of the area of the second capacitive monitor (301) (noted as A2) multiplied by the capacitance of the stack of print medium (106), measured by the first capacitive monitor (104, 108) (noted as C1) is determined. Finally, the first product is divided by the second product. That is, the number of pages =(C2*A1)/(C1*A2). Given the foregoing principles of the present invention, it will be obvious to someone familiar with this art that the capacitive plate described above can be replaced with various types of conductive elements with appropriate modifications to the capacitance formula.

Figure 4:
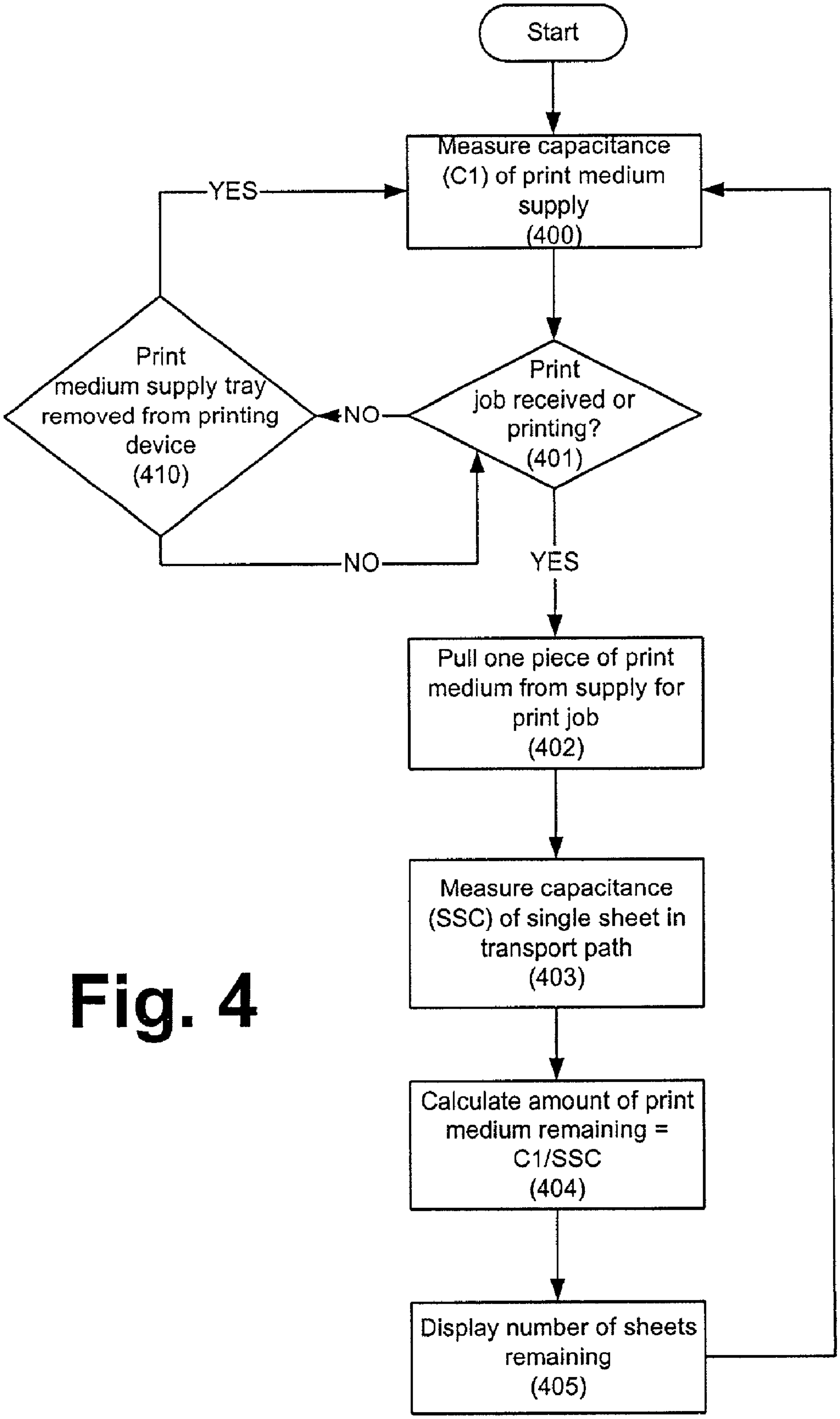
FIG. 4 is a flowchart detailing the operation of the print media monitor pictured in FIG. 3.

FIG. 4 is a flowchart detailing a preferred method of using the system illustrated in FIG. 3 to monitor the amount of print medium available in a printing device. As shown in FIG. 4, a measurement of the capacitance (C1) of the supply of print medium is taken (400). If the paper tray or the supply of print medium is then removed from the printer before a print job is received (410), this indicates that print media may have been added to or removed from the printing device, or that the type of print medium being used has changed. Consequently, the capacitance of the supply of print medium is retaken (400).

When a print job is received (401), a piece of print medium is pulled from the supply (402). As this piece of print medium moves through the transport path of the printing device, the second capacitive monitor measures the capacitance (SSC) of that single sheet of print medium (403). The approximate amount of print media available in the printer for the print job, including the piece of print media moving through the transport path, is then given by SSC divided by C1 [amount of print medium available=SSC/C1] (404). This amount can then be displayed (405), on the printer or on an associated host computer, to advise the user of the amount of print medium available. In the event that the area of the capacitive monitors are not equal then the amount of print medium available =(Area of first capacitive monitor*SSC)/(Area of second capacitive monitor*C1).

Figure 5:
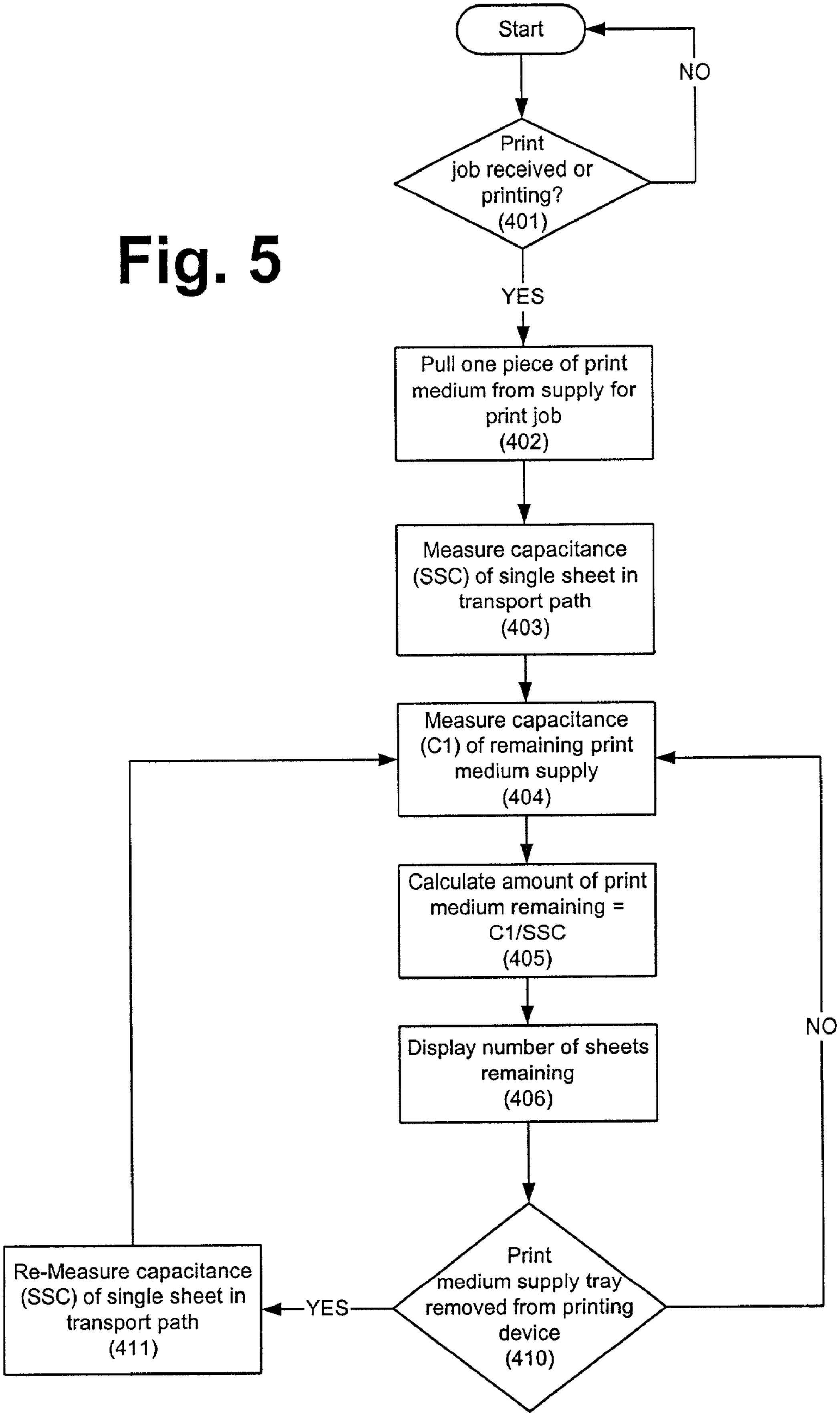
FIG. 5 is a flowchart detailing a second method of operating the print media monitor pictured in FIG. 3.

FIG. 5 illustrates an alternative preferred method for monitoring the amount of print medium available in the printing device depicted in FIG. 3. The method in FIG. 5 begins when a print job is received (401). A sheet of print medium is pulled from the print medium supply to execute the print job (402). The capacitance (SSC) of the sheet of print medium is measured by the capacitive monitor in the transport path (403). The capacitance (C1) of the remaining supply of print media is then measured (404). The amount of print medium in the supply is then given by SSC divided by C1 (405). The result can then be displayed (406) to advise the user of the amount of print medium available.

The method of FIG. 5 presumes that the capacitance of each sheet of print medium is essentially the same. Thus, SSC need only be measured once, unless the type of print medium is changed. Consequently, the method will next consider if the print medium tray or the print medium supply had been removed from the printing device (410). If not the system can continue to indicate the amount of print medium available by measuring the value of SSC divided by the capacitance (C1) of the supply of print medium. If however, there is an indication that the type of print medium being used has been changed, e.g., the print medium supply or supply tray has been removed from the printer at some time during the process, the capacitance (SSC) of a single piece of the print medium will be remeasured in the transport path (411).

Figure 6:
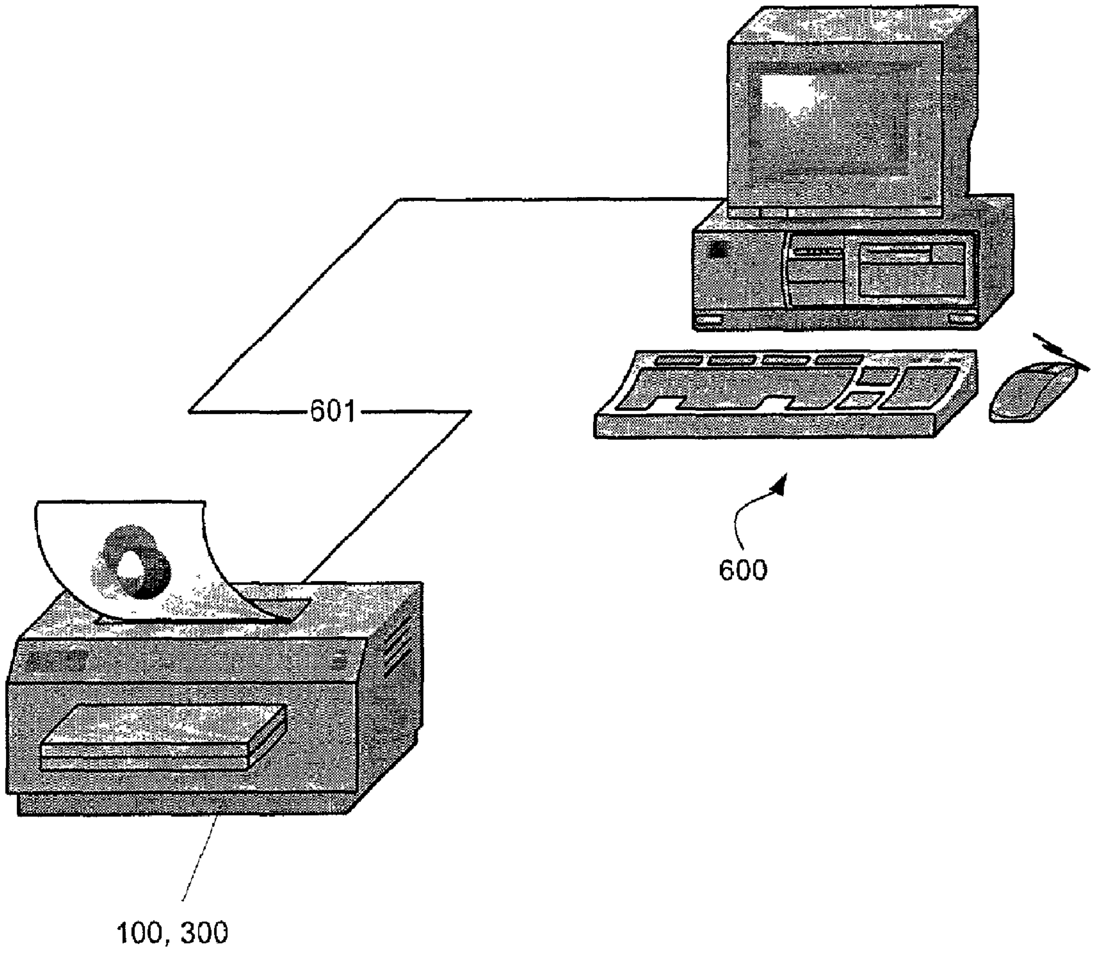
FIG. 6 illustrates a printing device with a print media monitor according to the present invention that is connected to a host computer.

FIG. 6 illustrates a basic computer system in which a printing device (100, 300), e.g. a printer, is connected to a host computer (600). The connection (601) between the printing device (100, 300) and the host computer (600) can be any connection for carrying data between the two devices, for example, a direct serial or parallel cable, a local area network (LAN), wide area network (WAN), etc.

A common scenario will be that the user generates or receives an electronic document with the host computer (600) and then desires to print the document. The user will appreciate knowing before or while sending the print job to the printing device (100, 300) whether there is a sufficient supply of print medium in the printing device to complete the job. Consequently, in the present invention, the printing device (100, 300) which is monitoring the amount of print medium using a capacitive monitor or monitors, as described above, will transmit to the host computer (600) an indication of the amount of print medium remaining or available for the print job. In this way, the user can know if the print job can be completed before leaving the computer (600) for the printing device (100, 300).

While the principles of the specification have been described above largely with regard to a printer, it will be understood that the principles apply to all printing devices, including, but not limited to, digital copiers, photocopiers, facsimile machines and the like. With a photocopier, the capacitive monitoring system described herein can be used to provide an indication on a display screen of the copier of the amount of print medium available. The same is true of, for example, a fax machine.

The preceding description has been presented only to illustrate and describe examples of the principles disclosed herein. It is not intended to be exhaustive or to limit the invention to any precise form disclosed. Many modifications and variations are possible in light of the above teaching.

The preceding description is intended to enable others skilled in the art to best utilize the invention in various embodiments and with various modifications as are suited to the particular use contemplated. It is intended that the scope of the invention be defined by the following claims.

What is claimed is:

1. A printing device with a capacitive monitoring system for monitoring an amount of print medium available, said printing device comprising:

a capacitive monitor for measuring capacitance indicative of an amount of said print medium available, said capacitive monitor comprising first and second conductive elements to which a voltage is applied, wherein, when said printing device is in operation, a supply of said print medium is interposed between said first and second conductive elements and functions as a dielectric element; and wherein said capacitive monitor determines said amount of print medium available by (1) measuring a first capacitance attributable to said supply of print medium at a first point in time, (2) measuring a second capacitance attributable to said supply of print medium at a second point in time after a single sheet of said print medium is removed from said supply following said first point in time, and (3) differencing said first and second capacitances to determine a capacitance value attributable to said single sheet of print medium from which said amount of print medium available is determined.

2. The printing device of claim 1, wherein a second of said conductive elements is disposed in a print medium tray that holds said supply of said print medium for a feeder mechanism which feeds sheets of said print medium from said supply into a print medium transport path.

3. The printing device of claim 1, wherein said print medium is paper.

4. The printing device of claim 1, further comprising a display on which said amount of print medium available is displayed.

5. The printing device of claim 1, wherein said printing device is a printer.

6. The printing device of claim 1, wherein said printing device is a photocopier.

7. The printing device of claim 1, wherein said printing device is a facsimile machine.

8. The printing device of claim 1, further comprising a connection to a host computer, wherein said printing device transmits an indication of said amount of print medium available to said host computer.

9. A printing device with a capacitive monitoring system for monitoring an amount of print medium available, said printing device comprising:

a capacitive monitor for measuring a capacitance in accordance with an amount of said print medium available, said capacitive monitor comprising first and second conductive elements to which a voltage is applied, wherein, when said printing device is in operation, a supply of said print medium is interposed between said first and second conductive elements and functions as a dielectric element;

wherein said capacitive monitor determines said amount of print medium available in accordance with capacitance measurements; and wherein a first of said conductive elements is located on a cantilever and biased toward said supply of print medium so as to remain in contact with said print medium.

10. The printing device of claim 9, wherein a second of said conductive elements is disposed in a print medium tray that holds said supply of said print medium.

11. The printing device of claim 9, wherein said print medium is paper.

12. The printing device of claim 9, further comprising a display on which said amount of print medium available is displayed.

13. The printing device of claim 9, further comprising a second capacitance monitor located in a transport path of said printing device, said second capacitance monitor determining a capacitance attributable to a single piece of print medium moving though said transport path, wherein said capacitive monitor determines said amount of print medium available in accordance with capacitance measurements from said capacitive monitor and said second capacitive monitor.

14. The printing device of claim 9, wherein said printing device is a printer.

15. The printing device of claim 9, wherein said printing device is a photocopier.

16. The printing device of claim 9, wherein said printing device is a facsimile machine.

17. The printing device of claim 9, further comprising a connection to a host computer, wherein said printing device transmits an indication of said amount of print medium available to said host computer.

18. A printing device with a capacitive monitoring system for monitoring an amount of print medium available, said capacitive monitoring system comprising:

a first capacitance monitor for measuring capacitance indicative of an amount of said print medium available, said capacitance monitor comprising first and second conductive elements to which a voltage is applied wherein, when said printing device is in operation, a supply of said print medium is interposed between said first and second conductive elements and functions as a dielectric element; and a second capacitor monitor located in a transport path of said printing device, said second capacitance monitor comprising first and second conductive elements disposed such that print medium moving in said transport path passes between said first and second conductive elements of said second capacitance monitor, said second capacitance monitor determining a capacitance attributable to a single piece of print medium moving through said transport path, wherein said capacitive monitoring system determines said amount of print medium available by dividing a capacitance value output by said first capacitance monitor with a capacitance value output by said second capacitance monitor.

19. The printing device of claim 18, wherein said first capacitance monitor is at least partially disposed in a print medium tray that holds said supply of said print medium.

20. The printing device of claim 18, further comprising a display on which said amount of print medium available is displayed.

21. The printing device of claim 18, further comprising a connection to a host computer, wherein said printing device transmits an indication of said amount of print medium available to said host computer.

22. A method of monitoring an amount of print medium available in printing device using a capacitive monitoring system, said method comprising:

monitoring changes in capacitance between first and second conductive elements to which a voltage is applied with a supply of said print medium interposed between said first and second conductive elements, said supply of print medium being depleted during operation of said printing device; and determining said amount of print medium available by determining a capacitance value associated with a single piece of said print medium and comparing that capacitance value with a capacitance value associated with said supply of print medium.

23. The method of claim 22, wherein:

said monitoring further comprises measuring a change in capacitance as a piece of said print medium is removed from said supply of print medium; and said determining further comprises determining said amount of said print medium available by comparing said change in capacitance to a capacitance measured across said supply of print medium.

24. The method of claim 22, wherein:

said monitoring further comprises measuring a capacitance of a single piece of said print medium as that piece of print medium moves through a transport path of said printing device; and said determining further comprises determining said amount of said print medium available by comparing said capacitance of said single piece of print medium to a capacitance measured across said supply of print medium.

25. The method of claim 24, further comprising remeasuring said capacitance of a single piece of said print medium whenever said supply of said print medium is removed from said printing device and then replaced.

26. The method of claim 22, wherein said supply of print medium comprises a plurality of pieces of print medium arranged in a stack.

27. The method of claim 22, wherein said supply of print medium is stationary in a tray from which a feeder mechanism feeds pieces of print medium into a print medium transport path.

28. A printing device with a capacitive monitoring system for monitoring an amount of print medium available, said printing device comprising:

means for determining a capacitance between first and second conductive elements to which a voltage is applied and between which a supply of said print medium is interposed to produce a capacitance value associated with said supply of print medium;

means for determining a capacitance value associated with a single piece of said print medium; and means for determining said amount of print medium available by comparing said capacitance value associated with a single piece of said print medium with said capacitance value associated with said supply of print medium.

29. The printing device of claim 28, wherein a second of said conductive elements is disposed in a print medium tray that holds said supply of said print medium.

30. The printing device of claim 28, further comprising a display means on which said amount of print medium available is displayed.

31. The printing device of claim 28, wherein said means for determining a capacitance value associated with a single piece of said print medium comprises means for determining a capacitance of third and fourth conductive elements to which a voltage is applied and between which a piece of said print medium passes when moving through a transport path.

32. The printing device of claim 28, wherein said printing device is any of a printer, a photocopier or a facsimile machine.

33. A printing device with a capacitive monitoring system for monitoring an amount of print medium available, said printing device comprising:

first means for determining a capacitance of first and second conductive elements to which a voltage is applied and between which a supply of said print medium is interposed; and means for determining said amount of print medium available in accordance with output from said means for determining a capacitance;

wherein a first of said conductive elements is located on a cantilever and biased toward said supply of print medium so as to remain in contact with said print medium.

34. The printing device of claim 33, wherein a second of said conductive elements is disposed in a print medium tray that holds said supply of said print medium.

35. The printing device of claim 33, further comprising a display means on which said amount of print medium available is displayed.

36. The printing device of claim 33, further comprising:

a second means for determining a capacitance of third and fourth conductive elements to which a voltage is applied and between which a piece of said print medium passes when moving through a transport path; and means for determining said amount of print medium available in accordance with output from said first and second means for determining a capacitance.

37. The printing device of claim 33, wherein said printing device is any of a printer, a photocopier or a facsimile machine.

* * * * *

UNITED STATES PATENT AND TRADEMARK OFFICE

CERTIFICATE OF CORRECTION

PATENT NO. : 7,072,077 B2 
APPLICATION NO. : 09/859852
DATED : July 4, 2006
INVENTOR(S) : Bradley J. Anderson et al.

It is certified that error appears in the above-identified patent and that said Letters Patent is hereby corrected as shown below:

In column 2, lines 46-47, after “original” insert -- capacitive monitor and the second capacitive monitor. --.

In column 5, line 57, delete “principals” and insert -- principles --, therefor.

In column 9, line 50, in Claim 13, delete “though” and insert -- through --, therefor.

In column 10, line 9, in Claim 18, delete “capacitor” and insert -- capacitance --, therefor.

Signed and Sealed this

Third Day of March, 2009

JOHN DOLL
*Acting Director of the United States Patent and Trademark Office*